United States Patent
Bauer et al.

(10) Patent No.: US 7,554,915 B2
(45) Date of Patent: Jun. 30, 2009

(54) METHOD AND A JITTER BUFFER REGULATING CIRCUIT FOR REGULATING A JITTER BUFFER

(75) Inventors: Wolfgang Bauer, Vienna (AT); Gerhard Fally, A-Wien (AT)

(73) Assignee: Siemens Aktiengesellschaft, Munich (DE)

( * ) Notice: Subject to any disclaimer, the term of this patent is extended or adjusted under 35 U.S.C. 154(b) by 825 days.

(21) Appl. No.: 10/800,209

(22) Filed: Mar. 12, 2004

(65) Prior Publication Data

US 2004/0184488 A1 Sep. 23, 2004

(30) Foreign Application Priority Data

Mar. 20, 2003 (DE) .............................. 103 12 438

(51) Int. Cl.
*H04L 12/26* (2006.01)
(52) U.S. Cl. ..................... 370/235; 370/230.1; 370/412
(58) Field of Classification Search ................ 370/235, 370/230.1, 412
See application file for complete search history.

(56) References Cited

U.S. PATENT DOCUMENTS

| 6,366,959 | B1 * | 4/2002 | Sidhu et al. .................. 709/231 |
| 6,434,606 | B1 * | 8/2002 | Borella et al. ................ 709/214 |
| 6,512,761 | B1 * | 1/2003 | Schuster et al. ............. 370/352 |
| 6,820,128 | B1 * | 11/2004 | Firoiu et al. ................. 709/233 |
| 2003/0112758 | A1 * | 6/2003 | Pang et al. .................. 370/235 |

FOREIGN PATENT DOCUMENTS

| WO | WO 95/14337 | 5/1995 |
| WO | WO 01/93516 | 12/2001 |

* cited by examiner

*Primary Examiner*—Jason E Mattis

(57) ABSTRACT

Transmission delays due to the buffering of data packets are registered for the purpose of regulating a jitter buffer. Weighted mean delay values are continuously derived from registered transmission delays, with a shorter transmission delay receiving a higher weighting than a longer transmission delay. A read-out speed of the jitter buffer is then regulated as a function of the continuously derived weighted mean delay values in such a way that the weighted mean delay values are adjusted as a regulating variable to a predefined desired delay.

6 Claims, 1 Drawing Sheet

METHOD AND A JITTER BUFFER REGULATING CIRCUIT FOR REGULATING A JITTER BUFFER

CROSS REFERENCE TO RELATED APPLICATIONS

This application claims priority to the German application No. 10312438.1 DE, filed Mar. 20, 2003 and which is incorporated by reference herein in its entirety.

FIELD OF INVENTION

In modern communication systems, connections for transmitting continuous data streams, as employed, for instance, for voice, video, and/or multimedia communication, are increasingly also being routed over packet oriented communication networks, such as LANs (Local Area Network), MANs (Metropolitan Area Network), and WANs (Wide Area Network). This technology forms the basis of, for example, what is called internet telephony, frequently also referred to as "Voiceover-Internet Protocol" (VoIP).

BACKGROUND OF INVENTION

To transmit a continuous data stream over a packet-oriented communication network, the data stream is first split into data packets for individual transmission which are each provided with a destination address and a timestamp. On exiting the packet-oriented communication network the data packets are reassembled into a continuous data stream. Being transmitted in the packet-oriented communication network basically mutually independently, the data packets generally do not arrive at their exit point at equidistant intervals or, frequently, in their original sequence. To balance out these variations in propagation time, before the data stream is assembled the data packets, or their data content, are usually intermediately stored in what is called a jitter buffer, from which they are read out at constant intervals. In this way it is possible to reconstruct a continuous data stream from data packets arriving at irregular intervals.

A disadvantage of a jitter buffer of this type is that the transmission of data is further delayed owing to buffering. The average time the data packets spend in the buffer should therefore be kept to a minimum. However, it must also be ensured that the average buffering time is not selected to be too short as that would prevent data packets which arrive late from being arranged within the time sequence for output from the jitter buffer. If a data packet arrives after a data packet which followed it in the original transmission sequence has already been fed out from the jitter buffer, the regular output time for the data packet arriving late will have elapsed and that data packet will have to be rejected. An aim of jitter buffer regulation is accordingly to minimize the average buffering time allowing for the ancillary condition of a rate of data packet loss which is still acceptable.

The practice to date for regulating a jitter buffer has been to measure the mean transmission delay due to buffering and to adjust it to a desired delay by means of a first regulating circuit. The desired delay can either be pre-specified and fixed or regulated by a second regulating circuit in such a way that the transmission delay is minimized while maintaining a rate of packet loss which is still acceptable. However, specifying a fixed desired delay limits the flexibility of jitter buffer regulation, while additionally regulating the desired delay has the disadvantage of requiring a second regulating circuit. Regulation is made substantially more complex by two, mutually influencing regulating circuits, and problems with stability may also arise.

SUMMARY OF INVENTION

The object of this invention is to disclose a method and a jitter buffer regulating circuit for regulating a jitter buffer which enable a mean transmission delay due to buffering to be adaptively minimized giving only low data packet losses.

Said object is achieved by means of a method with the features of claim 1 and by means of a jitter buffer regulating circuit with the features of claim 6.

For regulating a jitter buffer provided for buffering a data packet stream, a transmission delay due in each case to buffering is registered for data packets of the data packet stream. Weighted mean delay values are continuously derived from registered transmission delays, with a shorter transmission delay being given a higher weighting than a longer transmission delay. A readout speed of the jitter buffer is then regulated as a function of the continuously derived weighted mean delay values in such a way that the derived weighted mean delay values are adjusted to a predefined desired delay as a regulating variable.

The higher weighting of shorter transmission delays in forming the weighted mean delay values corresponds to a higher weighing of data packets which arrive late. This means a weighted mean delay value does not represent the average transmission delay of all buffered data packets but is rather a measure of the transmission delay of data packets which arrive late. Adjusting the length of the delay due to buffering of data packets which arrive late to a predefined desired delay provides a simple means of ensuring that data packets which arrive late will still be buffered.

A data packet arriving with an above-average delay which is added to the jitter buffer only just ahead of its readout time and so has a particularly short transmission delay will cause the weighted mean delay value to be reduced on account of the higher weighting of the transmission delay. This will in turn result in a reduction in the read out speed of the jitter buffer so that the weighted mean delay value is re-aligned with the desired delay. The readout speed will be reduced further if data packets that are even later are as a result of this added to the jitter buffer ahead of their regular output time. The read-out speed will otherwise remain largely constant or will be extended again if comparably late data packets fail to appear.

As a result of regulating the weighted mean delay values, the average transmission delay of the jitter buffer is automatically adapted to the degree of lateness of data packets which arrive late. In this way the transmission delay due to buffering can be minimized but at the same time made to comply with a low and, where applicable, settable rate of data packet loss. It is a major advantage of the invention that a single regulating circuit is required for this.

Advantageous embodiments and developments of the invention are disclosed in the dependent claims.

According to an advantageous embodiment of the invention, a new weighted mean delay value can be derived from, in each case, a previously derived weighted mean delay value and a currently registered transmission delay. The required computing effort can in this way be substantially reduced.

It is furthermore possible to compare a currently registered transmission delay with a previously derived weighted mean delay value and to determine the weighting of the currently registered transmission delay as a function of the result of this comparison. The currently registered transmission delay can preferably be weighted with a first predefined weight value if the currently registered transmission delay is shorter than the previously derived weighted mean delay value, and weighed with a second predefined weight value if the currently registered transmission delay is longer than the previously derived weighted mean delay value. The first weight value is higher here than the second weight value. In this way, to a certain extent a transmission delay which is that of a data packet arriving with an above-average delay and which is below the previous weighted mean delay value will have a higher weighting, so that the weighted mean delay value is automatically adapted to data packets which arrive late.

Specific regulating speeds for jitter buffer regulation can, if necessary, be set by suitably selecting the first and second weight value. The choice of the first weight value will here especially affect the speed with which jitter buffer regulation reacts to particularly late data packets. In contrast to this, the second weight value will affect the speed with which jitter buffer regulation reacts to the failure to appear of particularly late data packets.

BRIEF DESCRIPTION OF THE DRAWINGS

An exemplary embodiment of the invention is described in more detail below with the aid of the drawing.

DETAILED DESCRIPTION OF INVENTION

Figure 1:
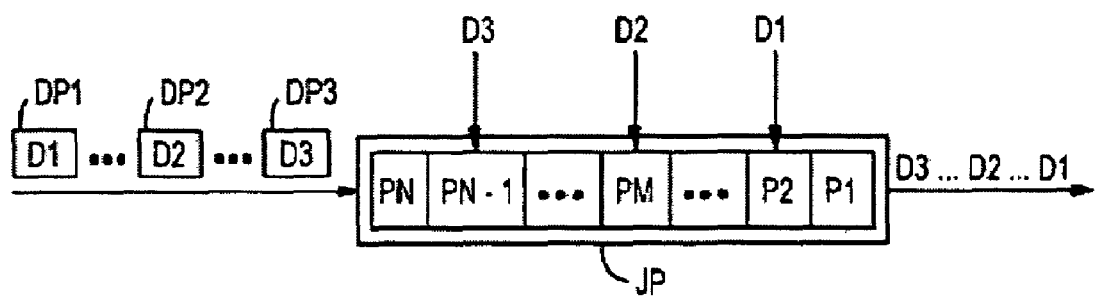
FIG. 1 is a schematic of a jitter buffer.

FIG. 1 is a schematic of a jitter buffer JP to which data packets DP1, ..., DP2, ..., DP3 of a preferably internet protocol based data packet stream, for example for real-time, voice, video and/or multimedia communication, are routed for buffering. Data packets DP1, ..., DP2, ..., DP3 in each case contain a timestamp indicating the original time position of the relevant data packet in the data packet stream. It is assumed in the present exemplary embodiment that data packets DP1, DP2, and DP3 were generated in the sequence indicated but that, owing to variations in propagation time, arrive at the jitter buffer JP in the sequence DP3, DP2, and DP1. Having been transmitted at above-average speed, data packet DP3 has thus overtaken data packet DP2, while data packet DP1, being particularly late, has fallen behind data packet DP2.

As useful data content, data packet DP1 contains communication data D1, data packet DP2 contains communication data D2, and data packet DP3 contains communication data D3. It is assumed in the present exemplary embodiment that communication data D1, D2, and D3 is VoIP communication data (VoIP: Voice-Over-Internet Protocol) in each case comprising digital sampling values of a voice signal.

The jitter buffer JP has a multiplicity of storage positions P1, ..., PN which are read out cyclically in the sequence indicated. To restore data packets DP1, DP2, and DP3 or, as the case may be, their useful data content D1, D2, and D3 to their original sequence, they are buffered in the sequence of the timestamps of data packets DP1, DP2, DP3 at storage positions P1, ..., PN of the jitter buffer JP. Data content D1, D2 or, as the case may be, D3 of an incoming data packet DP1, DP2 or, as the case may be, DP3 is therefore added at a storage position P1, ..., PN1 or, as the case may be, PN, determined by means of the timestamp of data packet DP1, DP2 or, as the case may be, DP3. Accordingly, the data content, in this case D3, of a data packet arriving particularly early, in the case DP3, is added at a rear storage position, in this case PN1, the data content, in this case D2, of a data packet, in this case DP2, with an average propagation time is added at a middle storage position, in this case PM, and the data content, in this case D1, of a data packet arriving late, in this case DP1, is added at a front storage position, in this case P2. In this way, data content D1, D2, and D3 and hence the sampling values of the voice signal are fed out by the jitter buffer JP in their original time sequence.

Figure 2:
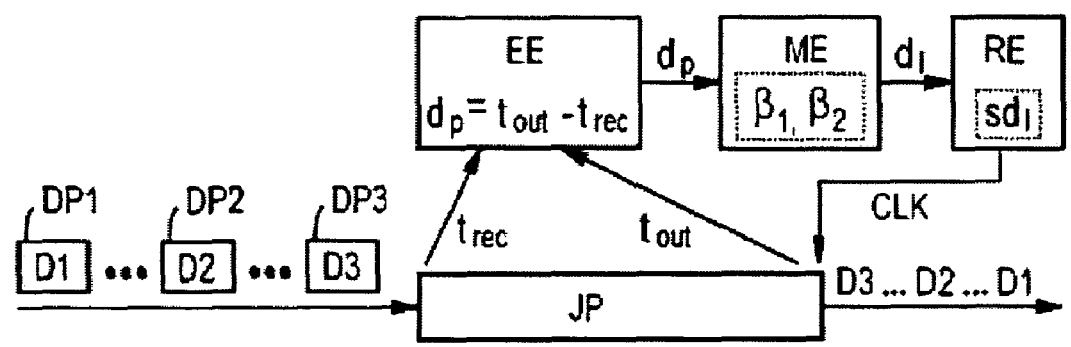
FIG. 2 is a schematic of a jitter buffer regulating circuit.

FIG. 2 is a schematic of a jitter buffer regulating circuit for regulating the jitter buffer JP. Reference numerals matching the reference numerals in FIG. 1 refer to the same items. Regulating of the jitter buffer JP is intended to minimize on the one hand the number of data packets which arrive late and so have to be rejected and, on the other hand, the average transmission delay of the data packets due to buffering. In this context, a data packet arriving too late is a data packet upon the arrival of which the output time of the corresponding storage position has already elapsed. In other words, the transmission delay due to buffering should be as short as possible but nonetheless sufficiently long to avoid perceptible packet losses.

The jitter buffer regulating circuit has a registration device EE for registering or measuring a transmission delay $d_p$ of a respective data packet, a mean-forming device ME for continuously deriving weighted mean delay values $d_1$ from registered transmission delays $d_p$, and a regulating device RE for regulating the readout speed of the jitter buffer JP as a function of the weighted mean delay values $d_1$. The registration device EE registers the receive time $t_{rec}$ for each of the data packets DP1, ..., DP2, ..., DP3 and the output time $t_{out}$ of the first sampling value of the relevant data packet from the jitter buffer JP. The transmission delay of the relevant data packet at $d_p=t_{out}-t_{rec}$ is determined from this. This substantially corresponds to the dwell time of the data content of the relevant data packet in the jitter buffer JP. The determined transmission delays $d_p$ of data packets DP1, ..., DP2, ..., DP3 are forwarded by the registration device EE to the mean-forming device ME, which continuously calculates the weighted mean delay values $d_1$ from them and forwards said values to the regulating device RE. The regulating device RE compares the arriving weighted mean delay values $d_1$ with a predefined desired delay $sd_1$ and, as a function thereof, regulates a read-out clock CLK with which the sampling values are read out from the jitter buffer JP in such a way that the weighted mean delay values $d_1$ are adjusted to the desired delay $sd_1$. To synchronize the data rate of the readout sampling values with downstream communication applications, the slight variation of the read out clock CLK due to regulation can be compensated by adding individual sampling values to or rejecting them from the stream of sampling values or by changing the sampling rate.

A regulating circuit for adjusting the weighted mean delay values $d_1$ as a regulating variable to the predefined desired delay $sd_1$ is implemented by means of the registration device EE, the mean forming device ME, and the regulating device RE. The registration device EE, the mean forming device ME, and the regulating device RE can preferably be implemented as program modules or program objects in terms of object oriented programming on a microprocessor system.

The weighted mean delay values $d_1$ are calculated by the mean-forming device ME in a recursive manner. A new weighted mean delay value $d_1$ is determined for each buffered data packet DP1, ..., DP2, ..., DP3 from its currently registered transmission delay $d_p$ and from the previously calculated weighted mean delay value $d_{1old}$ by means of the computing rule $d_1=(1-s) \cdot d_{1old}+s \cdot d_p$, where s is the weight value with which the currently registered transmission delay $d_p$ is entered in the weighted mean delay value $d_1$. The weight value s is determined for each arriving data packet by comparing its transmission delay $d_p$ with the previous weighted mean delay value $d_{1old}$, with $s=\beta_1$ if $d_p<d_{1old}$ and $s=\beta_2$ if $d_p \geq d_{1old}$. $\beta_1$ is a predefined first weight value and $\beta_2$ is a predefined second weight value, with $\beta_1$ being considerably larger than $\beta_2$. A transmission delay $d_p$ which is lower than the previous weighted mean delay value $d_{1old}$ is thus weighted much higher when the new mean delay value $d_1$ is calculated than a transmission delay $d_p$ which is higher than or equal to the previous weighted mean delay value $d_{1old}$.

Because of the higher weighting of shorter transmission delays $d_p$, the data packets which arrive late, in this case DP1, are given an above average weighting when the weighted mean delay values $d_1$ are formed. The weighted mean delay value $d_1$ thus substantially provides a measure for the transmission delay of the data packets which arrive late. Because the jitter buffer regulating circuit employs a measure for the transmission delay of the late data packets and not the average value of the transmission delays $d_p$ as a regulating variable, the jitter buffer JP is automatically regulated in such a way that data packets which arrive late just escape being lost.

The regulating speeds of the regulating circuit can be set by suitably selecting the individual weight values $\beta_1$ and $\beta_2$ and in this way adapted to the different transmission conditions. The first weight value $\beta_1$ here influences the speed with which the regulating circuit reacts to particularly late data packets. In contrast to this, the second weight value $\beta_2$ influences the speed with which the regulating circuit reacts to the failure to appear of particularly late data packets. The extent to which the weighted mean delay values $d_1$ are shifted toward short transmission delays $d_p$ is furthermore determined by the quotient of $\beta_1$ and $\beta_2$. The rate of packet loss can thereby be indirectly influenced. The rate of packet loss is generally reduced by increasing said quotient.

A first weight value $\beta_1$ in the order of 0.1 and a second weight value $\beta_1$ in the order of 0.001 are shown to be advantageous in a typical transmission situation. A selection of this type of the weight values $\beta_1$ and $\beta_2$ will result in an acceptable rate of packet loss in the order of 0.1-1% in situations where distributions of propagation times for data packets are typical.

$\beta_1$ being much larger than $\beta_2$, the weighted mean delay values $d_1$ will adjust faster to short transmission delays $d_p$ and will slowly reduce when late data packets fail to arrive. The transmission delay due to buffering can thus adjust relatively quickly, which is to say with few packet losses, to an increase in the number or lateness of late data packets. In this way the average transmission delay due to buffering—although not itself used as a regulating variable—is adjusted automatically to a minimum value with a low rate of packet loss being maintained at the same time. In contrast to the known art, only a single regulating circuit is required for this.

The invention claimed is:

1. A method for regulating a jitter buffer for buffering a data packet stream comprising:
   registering a transmission delay due to buffering for the data packets of the data packet stream;
   continuously deriving weighted mean delay values from registered transmission delays, wherein a shorter transmission delay is weighted higher than a longer transmission delay; and
   regulating a read-out speed of the jitter buffer as a function of the continuously derived weighted mean delay values so that said values are adjusted as a regulating variable to a predefined desired delay;
   comparing a currently registered transmission delay with a previously derived weighted mean delay value;
   determining a weighting of the currently registered transmission delay as a function of a result of the comparing, wherein the currently registered transmission delay is weighted with a first predefined weight value if the currently registered transmission delay is shorter than the previously derived weighted mean delay value and is weighted with a second predefined weight value if the currently registered transmission delay is longer than the previously derived weighted mean delay value, with the first weight value being larger than the second weight value, and further selecting a quotient of the first predefined weight value and the second predefined weight value to define a tradeoff between a delay introduced by the jitter buffer and a data packet loss rate.

2. A method according to claim 1, wherein a new weighted mean delay value is derived from a previously derived weighted mean delay value and a currently registered transmission delay.

3. A method according to claim 1, wherein the regulating variable is regulated by a single regulating circuit.

4. A method according to claim 2, wherein a currently registered transmission delay is compared with a previously derived weighted mean delay value, and the weighting of the currently registered transmission delay is determined as a function of the result of the comparison.

5. A method according to claim 2, wherein the regulating variable is regulated by a single regulating circuit.

6. A jitter buffer regulating circuit for regulating a jitter buffer for buffering a data packet stream comprising:
   a registration device for registering a transmission delay due to buffering of a respective data packet of the data packet stream;
   a mean-forming device for continuously deriving weighted mean delay values from registered transmission delays, with higher weighting of a shorter transmission delay compared to a higher transmission delay; and
   a regulating device for adjusting the continuously derived weighted mean delay values to a predefined desired delay by regulating a read-out speed of the jitter buffer as a function of the continuously derived weighted mean delay values,
   wherein a currently registered transmission delay is compared with a previously derived weighted mean delay value, and the weighting of the currently registered transmission delay is determined as a function of the result of the comparison,
   wherein the currently registered transmission delay is weighted with a first predefined weight value if the currently registered transmission delay is shorter than the previously derived weighted mean delay value and is weighted with a second predefined weight value if the currently registered transmission delay is longer than the previously derived weighted mean delay value, with the first weight value being larger than the second weight value, and
   selecting a quotient of the first predefined weight value and the second predefined weight value to define a tradeoff between a delay introduced by the jitter buffer and a data packet loss rate.

* * * * *